US010997149B2

(12) United States Patent
Srinivasan Natesan et al.

(10) Patent No.: US 10,997,149 B2
(45) Date of Patent: May 4, 2021

(54) RECIPE SHARING AND ADAPTATION

(71) Applicant: KONINKLIJKE PHILIPS N.V., Eindhoven (NL)

(72) Inventors: Anand Srinivasan Srinivasan Natesan, Eindhoven (NL); Rajendra Singh Sisodia, Eindhoven (NL); Chaitra Bhat, Eindhoven (NL); Aravind Gundumane, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 338 days.

(21) Appl. No.: 15/759,264

(22) PCT Filed: Sep. 27, 2016

(86) PCT No.: PCT/EP2016/072890
§ 371 (c)(1),
(2) Date: Mar. 12, 2018

(87) PCT Pub. No.: WO2017/055232
PCT Pub. Date: Apr. 6, 2017

(65) Prior Publication Data
US 2018/0253459 A1 Sep. 6, 2018

Related U.S. Application Data

(60) Provisional application No. 62/233,569, filed on Sep. 28, 2015.

(51) Int. Cl.
*G06F 16/23* (2019.01)
*G06F 16/245* (2019.01)
(Continued)

(52) U.S. Cl.
CPC .......... *G06F 16/23* (2019.01); *G06F 16/2246* (2019.01); *G06F 16/245* (2019.01); *G06Q 10/00* (2013.01)

(58) Field of Classification Search
CPC ...... G06F 16/23; G06F 16/245; G06F 16/224; G06Q 10/006
(Continued)

(56) References Cited

U.S. PATENT DOCUMENTS 8,145,854 B1 * 3/2012 Lee .................. G06Q 10/06316
711/154
8,218,402 B2 7/2012 Lewis
(Continued)

FOREIGN PATENT DOCUMENTS

WO 2012174595 A1 12/2012
WO 2013096136 A1 6/2013

OTHER PUBLICATIONS

Sven Reichel, Timo Muller, Oliver Stamm, Fabian Froh, Bjorn Wiedersheim and Michael Weber, "MAMPF: An intelligent cooking agent for zoneless stoves", Ulm University, Institute of Media Informatics, James-Franck-Ring 89081 Ulm, Germany.
(Continued)

*Primary Examiner* — Hares Jami

(57) ABSTRACT

A method and system are provided for adapting recipes to a cooking appliance. The method includes accessing, using a computing device, first electronic data describing capabilities of a first cooking appliance; accessing, via a network interface using the computing device, second electronic data describing capabilities of a second cooking appliance; comparing the second electronic data with the first electronic data to determine differences in the capabilities of the first and second cooking appliances; altering a recipe, designed for the capabilities of the first cooking appliance, using a processor of the computing device, based on the comparison of the first and second electronic data to adapt the recipe for the second cooking appliance; and converting the adapted recipe into a workflow, provided to a user of the second
(Continued)

cooking appliance, to enable performing the adapted recipe on the second cooking appliance.

17 Claims, 3 Drawing Sheets

(51) Int. Cl.
  *G06F 16/22* (2019.01)
  *G06Q 10/00* (2012.01)
(58) Field of Classification Search
  USPC .................................................. 707/705, 736
  See application file for complete search history.

(56) References Cited

U.S. PATENT DOCUMENTS

| | | |
|---|---|---|
| 2008/0143550 A1 | 6/2008 | Ebrom |
| 2010/0161082 A1 | 6/2010 | Ebrom |
| 2010/0213187 A1* | 8/2010 | Bandholz ............. H05B 6/6441 |
| | | 219/506 |
| 2013/0052616 A1 | 2/2013 | Silverstein |
| 2014/0170275 A1 | 6/2014 | Bordin |
| 2016/0081515 A1* | 3/2016 | Aboujassoum ........... G09B 5/02 |
| | | 426/231 |
| 2016/0154830 A1* | 6/2016 | Papotti .................. G06F 16/284 |
| | | 707/692 |
| 2016/0381742 A1* | 12/2016 | Banavara ............. H05B 6/6438 |
| | | 99/331 |
| 2017/0082996 A1* | 3/2017 | Koennings ............ A47J 43/046 |

OTHER PUBLICATIONS

Jeremy Cohen, Robert Sami, Aaron Schild, Spencer Tank, "Recipe Recommendation" May 13, 2014.
http://www.hippressurecooking.com/pressure-cooker-recipe-converter/, date: Apr. 23, 2015.
http://www.thekitchn.com/paprika-product-review-183362, date: Apr. 23, 2015.

* cited by examiner

RECIPE SHARING AND ADAPTATION

This application is the U.S. National Phase application under 35 U.S.C. § 371 of International Application No. PCT/EP2016/072890, filed on Sep. 27, 2016, which claims the benefit of U.S. Provisional Application No. 62/233,569 filed on Sep. 28, 2015. These applications are hereby incorporated by reference herein.

TECHNICAL FIELD

The present invention relates to methods and apparatus for sharing cooking recipes, and in particular to methods and apparatus for sharing cooking recipes among varying cooking devices.

BACKGROUND

Sharing cooking recipes between users or computers typically involves sharing text, videos or a multimedia presentation of a desired recipe. A recipe may be intended for use with a particular kind of cooking apparatus and may require conversion before it can be used effectively with another type of cooking apparatus. This conversion process can be tedious, requiring trial and error and resulting in the waste of food ingredients. This problem is magnified when one considers that in today's networked environment, a source recipe can originate on the Internet having been authored for an appliance made in another country having a different environment.

For example, cooking with an open lid cooking device as opposed to cooking with a closed lid cooking device as opposed to cooking with a pressure cooker involves dissimilar environmental conditions in each case. A recipe intended for one type of cooking device and prepared in a dissimilar cooking appliance may require different time durations, temperatures, ingredients and/or other operations such as stirring and the like to prepare the recipe. Similarly the sequence of mixing the ingredients may also change when using a dissimilar cooking appliance. Because a pressure cooker cannot be opened mid-way in the cooking process, recipe ingredients must be added together at an earlier stage of the cooking process while using a pressure cooker. Using the same recipe outside a pressure cooker may permit selected ingredients to be added at a later stage.

Cooking appliance compatibility issues may also involve the availability of stirring features versus a lack of stirring features. In a cooking appliance without stirring features, the ingredients may need to be modified (e.g., to use more oily contents) or periodic interventions may need to be performed in order to prevent sticking.

Translating one recipe workflow into another workflow process to meet the requirements of a dissimilar cooking device thus typically requires significant manual analysis, especially considering the multitude of cooking devices available.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Generally speaking, the present invention relates to apparatus, methods and systems for sharing cooking recipes among varying cooking devices. Typically recipe sharing involves sharing text, videos or a multimedia presentation of a desired recipe. However in many cases, and in view of the rapidly growing options in cooking appliances, recipes are written for a particular cooking appliance, which may be different from the cooking appliance(s) in a cook's kitchen. Thus, adapting a shared recipe to match the capabilities of a cooking appliance becomes necessary.

For example, environmental conditions are different while cooking using an open lid cooking device versus cooking using a closed lid cooking device versus cooking using a pressure cooker. In addition, the same recipe prepared in a different cooking appliance may require different time durations, temperatures, ingredients and/or other operations such as stirring and the like to prepare the recipe in the different cooking appliance. For example, adapting a frying recipe, which calls for oil, to an air fryer appliance, which is used for cooking with little or no oil, would require the removal or reduction of the oil used. Similarly, the sequence of mixing the ingredients may also change when using a different cooking appliance. For example, a pressure cooker cannot be opened mid-way in the cooking process, and hence ingredients of the recipe need to be added together at an earlier stage of the cooking process while using a pressure cooker. When using the same recipe outside a pressure cooker, selected ingredients might be added at a later stage than when using a pressure cooker.

Another issue of cooking appliance compatibility involves the availability of stirring features versus non-stirring features. To prevent sticking in a cooking appliance lacking stirring features, either the ingredients need to be modified (e.g., to use more oily contents) or else periodic interventions may need to be performed.

The invention facilitates determining workflows as a result of adapting recipes so as to be compatible with different cooking devices that have different functional capabilities, capacities, and other characteristics. Hence, to accomplish recipe sharing with or between one or more "smart" cooking appliances, various recipe steps need to be adapted to address the functional capabilities of the one or more various cooking appliances being utilized for cooking. Currently there are no convenient mechanisms to easily facilitate recipe sharing, and it can require significant effort to manually translate one recipe workflow to another workflow. The manual translation may not even be possible for a given user who does not know the specifications and/or capabilities and limitations of the appliance, or who does not have the cooking, computational, or technical skills to perform the translation.

Various embodiments of the invention accomplish recipe sharing by performing a number of steps, including but not limited to determining the functional capabilities of a cooking appliance, determining whether a recipe can be adapted to that appliance, adapting a recipe to that appliance, and then sharing the adapted recipe.

In one aspect, embodiments of the invention relate to a method for adapting recipes to a cooking appliance. The method includes a computing device accessing electronic data describing the capabilities of a cooking appliance. The computing device then alters the recipe using a processor by utilizing the accessed electronic data.

In one embodiment, receiving electronic data describing the capabilities of a cooking appliance includes querying an electronic database or a cooking appliance using a network interface to receive electronic data describing the cooking appliance capabilities.

In one embodiment, altering the recipe includes altering at least one of the ingredients, ingredient amounts, the cooking temperature, the cooking duration, the recipe format, a cooking operation (e.g., stirring, mixing, etc.) or the order of execution, so that the recipe is compatible with the capabilities of the cooking appliance.

In one embodiment, the electronic data describing the capabilities of a cooking appliance is in schema tree format. The method further includes performing matching algorithms on the schema tree electronic data.

In one embodiment, the method further includes receiving, using the network interface, electronic data describing at least one ingredient substitution for a cooking appliance.

In one embodiment, the method further includes converting the recipe into a workflow process and providing the workflow process to a user of the cooking appliance.

In one embodiment, the method further includes converting the recipe into an audio communication or video communication and transmitting the communication to a user of a cooking appliance.

In one embodiment, the method further includes transmitting, using the network interface of the computing device, the adapted recipe to the cooking appliance.

In one embodiment, the computing unit is contained within a cooking appliance. In other words, a cooking appliance in accord with the present invention may include one or more computing units.

In another aspect, embodiments of the present invention relate to a system for adapting recipes. The system includes a cooking appliance, a processor, and computer executable instructions operative on the processor for receiving first electronic data describing the capabilities of the cooking appliance, receiving second electronic data describing a recipe, and comparing the first and second electronic data. The result of the comparison may be used to determine whether the recipe can be adapted for use with the cooking appliance.

In one embodiment, the system includes computer executable instructions operative on the processor for receiving, by querying an electronic database or the cooking appliance using the network interface, electronic data describing the capabilities of the cooking appliance.

In one embodiment, the system includes computer executable instructions operative on the processor for altering the recipe by altering at least one of the ingredients, ingredient quantities, the cooking temperature, the cooking duration, the recipe format, cooking steps, or the order of execution, so that the recipe is compatible with the capabilities of the cooking appliance.

In one embodiment, the system includes computer executable instructions operative on the processor for performing matching algorithms on electronic data describing the capabilities of the second cooking appliance, where the electronic data is in schema tree format.

In one embodiment, the system includes computer executable instructions operative on the processor for altering the second electronic data describing the recipe utilizing the first electronic data describing the capability of the cooking appliance.

In one embodiment, the system further includes computer executable instructions operative on the processor for receiving, using a network interface of the computing unit, electronic data describing at least one ingredient substitution for the cooking appliance.

In one embodiment, the system further includes computer executable instructions operative on the processor for converting the altered recipe into a workflow process and providing the workflow process to a user of the cooking appliance.

In one embodiment, the system further includes computer executable instructions operative on the processor for converting a recipe into an audio communication or a video communication and transmitting the communication to a user of the cooking appliance.

In one embodiment, the system further includes computer executable instructions operative on the processor for transmitting, using the network interface of the computing device, the adapted recipe to the second cooking appliance.

In one embodiment the processor is contained within the cooking appliance. In one embodiment the processor is contained within a second cooking appliance.

In one embodiment the system further includes a second processor having computer executable instructions operative thereon for altering the second electronic data describing the recipe utilizing the first electronic data describing the capabilities of the cooking appliance. The system may further include computer executable instructions operative on the processor for receiving the altered second electronic data.

In still another aspect, embodiments of the present invention relate to a computer readable medium containing computer-executable instructions for performing a method for adapting recipes to a cooking appliance, the medium including computer executable instructions operative on a processor for receiving, using a network interface of a computing device, electronic data describing the capabilities of a cooking appliance, adapting, using a processor of the computing device, a recipe utilizing the received electronic data, and transmitting, using the network interface, the adapted recipe to a cooking appliance.

In one embodiment, the medium includes computer executable instructions operative on a processor for receiving, by querying a cooking appliance using a network interface, electronic data describing the capabilities of a cooking appliance.

In one embodiment, the medium includes computer executable instructions operative on a processor for adapting the recipe by adapting at least one of the ingredients, the cooking temperature, the cooking duration, the recipe format, and the order of execution, so that the recipe is compatible with the capabilities of the cooking appliance.

In one embodiment, the medium includes computer executable instructions operative on a processor for performing matching algorithms on electronic data describing capabilities of the cooking appliance, where the electronic data is in schema tree format.

In yet another aspect, embodiments of the present invention relate to a system for adapting recipes. The system includes a first cooking appliance, a second cooking appliance, and a processor. The system also includes computer executable instructions operative on the processor for receiving first electronic data describing the capabilities of the first cooking appliance, receiving second electronic data describing the capabilities of the second cooking appliance; and comparing the first and second electronic data to determine whether a recipe for use with the first cooking appliance is adaptable for use with the second cooking appliance.

In one embodiment, the system further includes computer executable instructions operative on the processor for altering electronic data describing a recipe utilizing the second electronic data describing the capabilities of the second cooking appliance. The system may additionally include computer executable instructions operative on the processor for receiving the altered electronic data.

In one embodiment the processor is in communication with at least one of the first cooking appliance and the second cooking appliance.

These and other features and advantages, which characterize the present non-limiting embodiments, will be apparent from a reading of the following detailed description and a review of the associated drawings. It is to be understood that both the foregoing general description and the following detailed description are explanatory only and are not restrictive of the non-limiting embodiments as claimed.

BRIEF DESCRIPTION OF DRAWINGS

Non-limiting and non-exhaustive embodiments are described with reference to the following Figures in which.

In the drawings, like reference characters generally refer to corresponding parts throughout the different views. The drawings are not necessarily to scale, emphasis instead being placed on the principles and concepts of operation.

DETAILED DESCRIPTION

Figure 1:
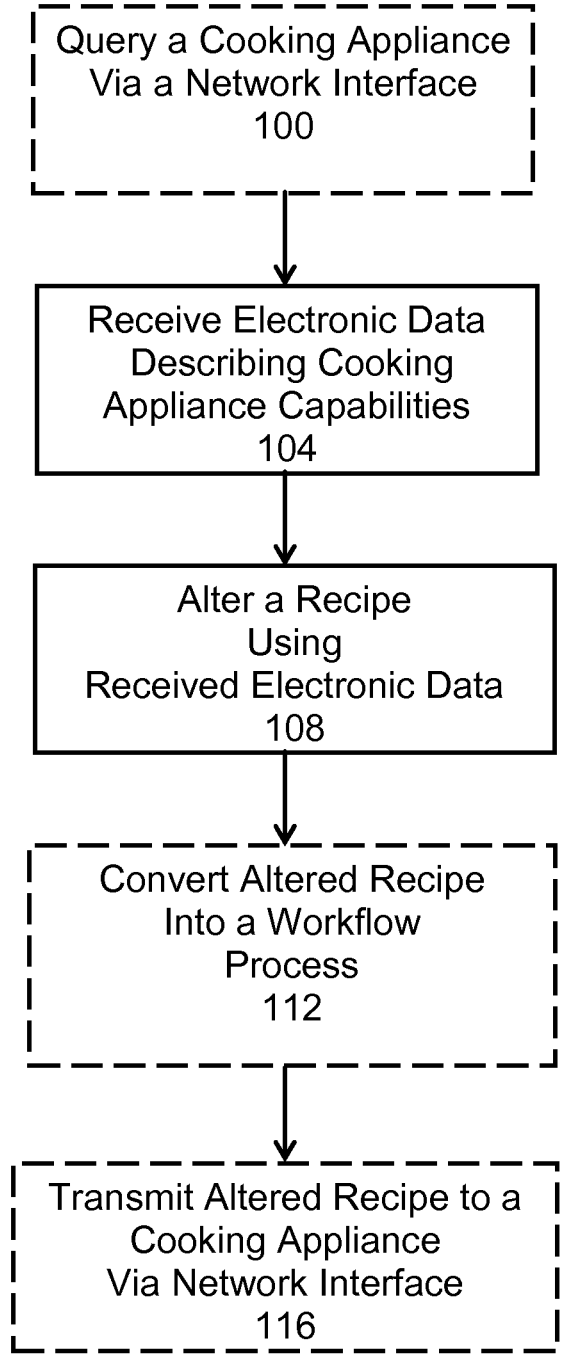
FIG. 1 is a flow diagram illustrating one embodiment of a method for recipe sharing in accord with the present invention.

Various embodiments are described more fully below with reference to the accompanying drawings, which form a part thereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are the means used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions that could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes and may not have been selected to delineate or circumscribe the inventive subject matter. Accordingly, the disclosure of the present invention is intended to be illustrative, but not limiting, of the scope of the invention, which is set forth in the claims.

INTRODUCTION

Embodiments of the present invention relate to apparatus, methods and systems for sharing a recipe among multiple cooking appliances or devices and/or among multiple users.

Some embodiments of the invention involve "smart" or intelligent cooking devices with network interfaces, user interfaces, processors, memory and/or storage, at least one data source, and computer executable instructions executing on a processor for adapting cooking recipes between different cooking devices. Embodiments of the invention allow a cooking appliance to utilize a recipe designed for a dissimilar cooking appliance without the need for a user to manually adapt the recipe.

Further embodiments of the invention determine whether a particular appliance can be adapted for use with a given recipe. Still further embodiments of the invention determine which of a plurality of appliances can be used or adapted for use with a given recipe.

In overview, embodiments of the invention accomplish recipe sharing by performing a number of steps, including but not limited to determining the capabilities of a cooking appliance, determining whether the appliance can be used to prepare part or all of a recipe; adapting a recipe to be compatible with the capabilities of the cooking appliance and, when the appliance or device performing the adaption is different than the target appliance, sharing the adapted recipe with the target cooking appliance or other cooking appliances or users.

In some embodiments, the adaptation process is performed by a computing unit which may itself be a cooking device (or a computing device or hosted service) which may in turn be controlled by yet another computing unit. For example, a smartphone user may direct a cloud-based embodiment of the service to retrieve a recipe, e.g., from a website, analyze the recipe to determine that the recipe targets a conventional oven, and adapt that recipe to the user's kitchen. The cloud-based service may then communicate with the user's kitchen, determine that the user's oven is busy cooking another food item at the desired time, retrieve data concerning other appliances in the user's kitchen to identify another appliance which can be used instead (or the cook can identify another device manually), such as an available pressure cooker, on the user's network, retrieve data concerning the pressure cooker's capabilities (either directly from the cooker or another data source), adapt the recipe to the pressure cooker, and then push the recipe to the pressure cooker or other device for later use.

Each cooking device may be associated with an electronic profile describing the functionalities and features which define the cooking device's capabilities and limitations. Such cooking device profiles might be stored in the cooking devices themselves, subject to retrieval over some kind of network interface contained in the cooking device, or the cooking device profiles might be stored in a network-accessible database containing the functionalities and features of various models of cooking devices. In the latter scenario, according to various embodiments, the cooking device would be queried for identifying information which can be used to access its profile in the database.

In some embodiments of the invention, one or more cooking device profiles might be stored in an electronic data format such as eXtensible Markup Language (XML). Using schema tree matching algorithms, one cooking device's profile in XML data format can be compared to another cooking device's profile in XML format. In some embodiments, these matching algorithms determine similarity and compatibility between cooking devices, in some cases assigning particular scores representing similarity and/or compatibility, and identify the common functionalities between cooking devices.

Regarding the matching algorithms, in various embodiments, particularly for the schema matching, algorithms such as COMA++, Similarity Flooding and Harmony are used for matching XML schemas as well as database schemas. Most of these algorithms (e.g., Similarity Flooding techniques) also use semantic relationships, such as the use of semantic graphs to make XML and its metadata matching more accurate and efficient.

In some embodiments, these matching algorithms are applied to semantic graphs built from the aforementioned XML data structures, which are themselves typically trees, by connecting all the leaf nodes of the tree with a root node. The conversion creates a completed cyclic graph and can be used to match sub graphs created from XML trees corresponding to, e.g., other devices or appliances.

Based on compatibility and/or common functionalities between the cooking devices, a decision can be made as to whether a second cooking device can utilize a recipe designed for a first cooking device. With the use of recipe translation algorithms, a food dictionary database, and an analysis of the capabilities of the first cooking device and the second cooking device, the recipe sharing system can determine the recipe ingredients and action items required to utilize the recipe intended for the first cooking device with the second cooking device, as discussed in greater detail below.

This example illustrates some aspects of the recipe adaption process. Assume a particular rice variety needs to be cooked by boiling the rice. Boiling the rice with an open lid at constant temperature may require twice the cooking time compared to boiling the rice with a closed lid. Cooking the rice with a pressure cooker may in turn require half the time of boiling the rice with a closed lid, assuming the same cooking temperature. Hence the recipe instructions need to be adapted depending on the cooking device used. Similarly the amount of water required to cook the rice will also vary depending on the cooking device used.

As a further example, assume a recipe is for use with an oil fryer, but the cook owns an air fryer (i.e., an appliance that fries without the use of oil). This recipe would be adapted for use with the air fryer by, at minimum, removing the oil ingredient.

In some embodiments, methods employed by the present invention accomplish the adaption process using a food dictionary. Having compared the cooking device capabilities, the inventive methods identify the required action items and the appropriate cooking times for particular ingredients by consulting the food dictionary. The inventive methods also identify those steps which can be performed by a compatible cooking device, those steps that need to be transformed before being used by a different cooking device, or performed altogether using other cooking devices.

After the capabilities of the cooking devices are compared and the recipe designed for a first cooking device is adapted for a second cooking device, a user can share the same recipe with a second user by various methods: providing the second user with an executable work flow in text format, providing the second user with a video that describes the adapted cooking recipe and that allows for some user interactivity during preparation of the recipe. The adapted recipe may also be shared directly with another cooking appliance or device.

Further embodiments of the recipe sharing invention adapt recipes considering the recipe contents as well as the cooking device capabilities, including the order of ingredients added in the recipe, the recipe execution steps, the semantics of the recipe contents, each of which may be considered in light of capabilities of the cooking device which is the target for the adapted recipe.

EMBODIMENTS

FIG. 1 is a flowchart illustrating one embodiment of a method for adapting cooking recipes to a cooking appliance utilizing a computing unit in accord with the present invention. In some embodiments, a computing device (which may itself be a cooking appliance) using a network interface, queries a cooking appliance (or multiple cooking appliances) for electronic data describing the capabilities of the cooking appliance (Step 100). In other embodiments of the invention, the computing unit, using a network interface, queries an electronic database for electronic data on the capabilities of a cooking appliance (step not shown). In still other embodiments, the computing unit is itself the cooking appliance that is the target for the adapted recipe, and it accesses local memory or a network-accessible data source to retrieve data describing its own capabilities.

The computing unit then receives electronic data describing the cooking capabilities of the cooking appliance(s) (Step 104). As discussed above, this data may be structured in XML format to facilitate its comparison with other structured data and use in the adaptation process.

Using the received electronic data, and comparing with the recipe, a determination can be made as to whether a given appliance (or which appliance among various appliances) can be employed to prepare the recipe. Alternatively, the user/cook can select the appliance to be used. Then, a cooking recipe is altered or adapted for use by the second cooking appliance (Step 108). As discussed above, a food dictionary may be used for particular ingredient substitutions and various recipe translation algorithms can be used to convert, e.g., a recipe intended for a first (e.g., an open) cooking environment into a second (e.g., a closed) cooking environment, after the device capabilities are analyzed as discussed above.

In some embodiments of the invention, the altered cooking recipe is then converted into a workflow process suitable for use by an operator of the cooking appliance (Step 112). The workflow process may include a list of recipe steps in a textual format to be performed by the recipe user. The altered cooking recipe may also be converted into one or more audio or video communications, which are then electronically transmitted to the user of the cooking appliance (step not shown).

In some embodiments of the invention, the altered cooking recipe is then transmitted, via a network interface, to the cooking appliance that is the target of the recipe adaptation process (Step 116). In other embodiments, the computing unit itself is the cooking appliance, and it utilizes the adapted recipe locally—presenting workflows and/or media communications to a user, automatically executing one or more adapted recipe steps, etc.

Figure 2:
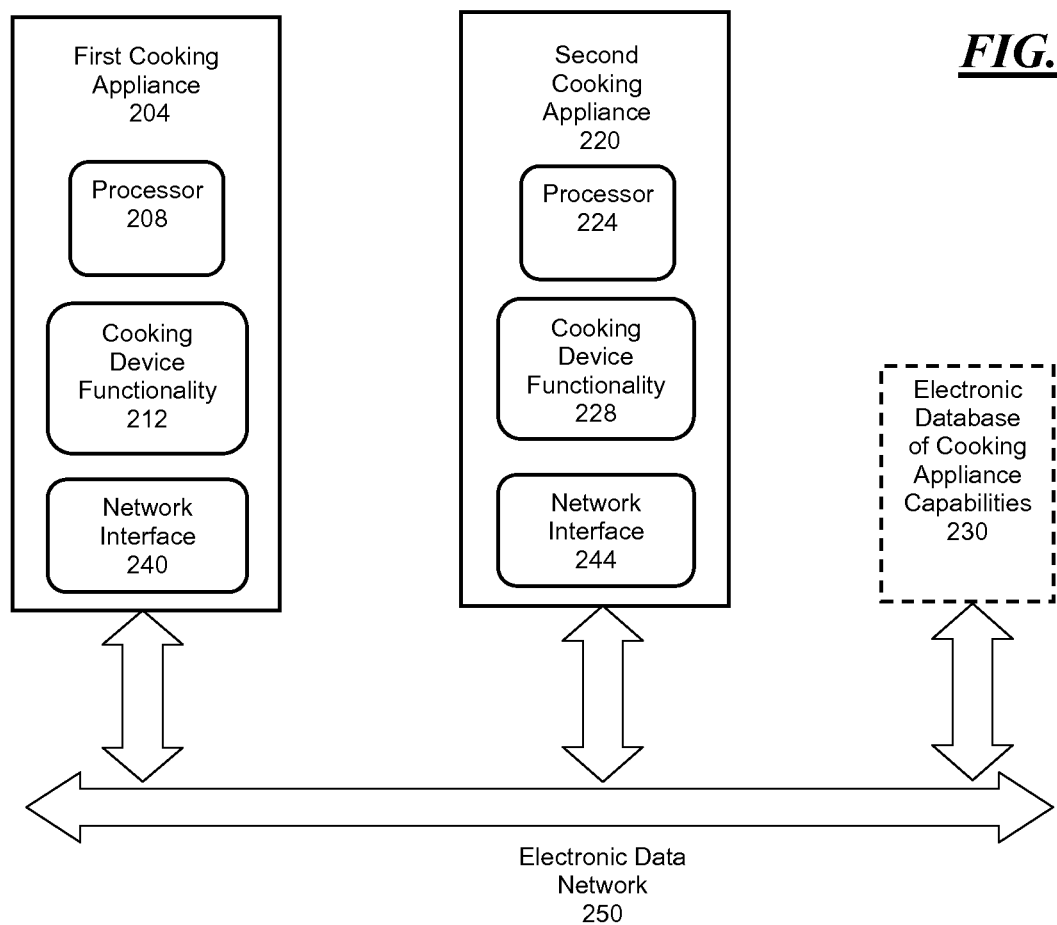
FIG. 2 is a block diagram presenting one embodiment of a system for recipe sharing in accord with the present invention.

FIG. 2 is a block diagram illustrating one embodiment of a system for sharing recipes including a first cooking appliance 204 in the role of the computing unit discussed above, a second cooking appliance 220, electronic data network 250, and an optional electronic database of cooking appliance capabilities 230. Each cooking appliance 204, 220 includes its own cooking device functionalities and capabilities 212,228 that are specific to that model of cooking appliance.

The first cooking appliance 204 operates with a processor unit 208 and network interface 240 as discussed above and cooking appliance functionality 212, including but not limited to a heating element (e.g., a burner, an oven), a cooling element (e.g., a refrigerator), a chopper, a grinder, a blender, etc. Normally the processor 208 in a computing unit can take a variety of forms, such as a server computer, desktop computer, laptop computer, tablet, phablet, smartphone, etc., but when the computing unit is a cooking appliance, the processor 208 will typically take the form of an embedded processor in the appliance. Similarly, the network interface 240 in a computing unit may take a variety of forms, including but not limited to a Token Ring interface, an Ethernet interface, a 2G/3G/4G wireless interface, etc., but when the computing unit is a cooking appliance the network interface 240 will typically take the form of an 802.11x wireless interface. The second cooking appliance 220 similarly has similar processor unit 224, cooking appliance functionality 228, and network interface 244, as discussed above.

The first and second cooking appliances 204, 220 communicate with each other and with the optional electronic database 230 via network interfaces 240, 244 connected to an electronic data network 250. In embodiments where the processors 208, 224 are external to the cooking appliances 204, 220, the processors 208, 244 will typically include their own network interfaces (not shown) for communications with the cooking appliances 204, 220 and the optional electronic database 230.

The processor units 208, 224 may be, in some embodiments, an ARM-based or x86-based general purpose processing unit. In some embodiments, the functionality of the cooking appliances 204, 220 and the processor units 208, 224 are offered by the same device. In still other embodiments, the processing capabilities of the processor units 208, 224 may be implemented across the processor units 208, 224 and one or more additional computing devices (not shown). The following discussion assumes the cooking appliances 204, 220 and the processor units 208, 224 are implemented in the same physical devices for convenience, although this should not be construed to be limiting as to the overall scope of the present invention.

In operation, the first cooking appliance 204 may execute instructions on its processor 208 to query, using its network interface 240, either the second cooking appliance 220 or else the electronic database 230. The first cooking appliance 204 then receives electronic data describing the cooking capabilities of the second cooking appliance 220.

The processor unit 208 in the first cooking appliance 204 may then execute algorithms and consult one or more databases for comparing the capabilities of the second cooking appliance 220 with the capabilities of the first cooking appliance 204 and/or the recipe, and for altering the cooking recipe as discussed above by altering at least one of the ingredients, the cooking temperature, the cooking duration, the recipe format, the order of execution, etc., so that the cooking recipe is compatible with the capabilities of the second cooking appliance 220.

In one embodiment, the processor unit 208 in the first cooking appliance 204 may perform matching algorithms on the electronic data describing the capabilities of the second cooking appliance 220, where the electronic data is in schema tree format.

In one embodiment, the processor unit 208 in the first cooking appliance 204 may execute instructions for receiving electronic data describing ingredient substitutions for the second cooking appliance 220.

In one embodiment, the processor unit 208 in the first cooking appliance 204 may execute instructions for converting a cooking recipe into a workflow process and providing the workflow process to the second cooking appliance 220 using network interfaces 240, 244.

In one embodiment, the processor unit 208 in the first cooking appliance 204 may execute instructions for converting a cooking recipe into an audio communication or a video communication and transmitting the communication to a user of the second cooking appliance 220.

In one embodiment, the processor unit 208 in the first cooking appliance 204 may execute instructions for transmitting, using the network interface of the computing device, the adapted receipt to the cooking appliance.

Figure 3:
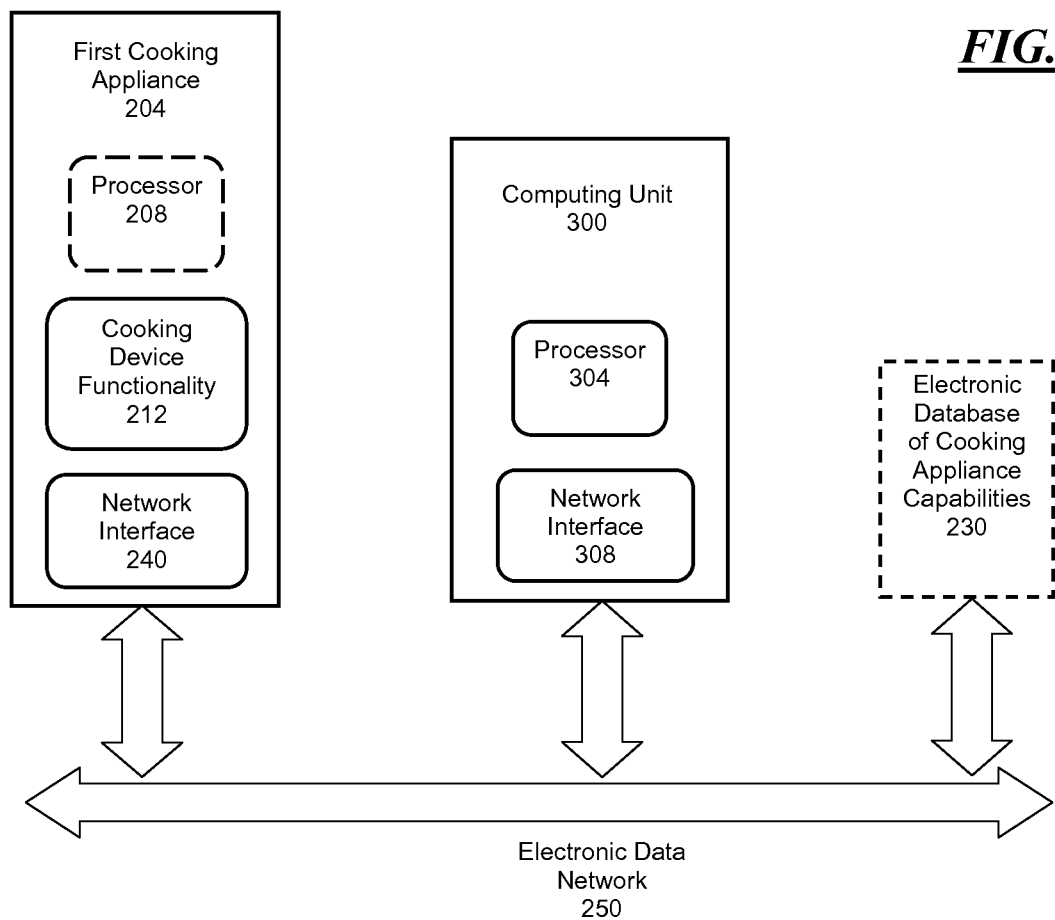
FIG. 3 is a block diagram presenting another embodiment of a system for recipe sharing according to the present invention.

FIG. 3 presents another embodiment of a system for recipe sharing in accord with the present invention. In contrast to the embodiment of FIG. 2, this embodiment includes a computing unit 300 that is not a component of a cooking appliance 204. The other components of the system are otherwise similar to the correspondingly numbered elements of FIG. 2.

The cooking appliance 204, as shown, may still include processing functionality 208 but the role of the processor 208 is typically limited in this embodiment to responding to requests to provide information identifying the appliance 204 and/or its cooking capabilities 212. In this embodiment, the computing unit 300, which may take the form of a hosted service, may determine whether an appliance 204 is compatible with a desired recipe (i.e., whether it is possible to adapt the recipe to the appliance) and/or adapt the recipe for use on the appliance.

The adapted recipe may be delivered to the appliance 204 for execution and/or display on a user interface element (not shown) of the appliance 204. The adapted recipe may also be provided to another device like, e.g., a smartphone or tablet computer (not shown).

While the foregoing discussion describes recipe sharing with respect to a target appliance for the recipe adaptation process, or a pair of appliances when a recipe initially targets one appliance and is adapted for use with a second appliance, one of ordinary skill would recognize that various embodiments of the present invention are capable of sharing recipes among a plurality of cooking appliances or devices in that any plurality may be decomposed into individual appliances or pairs of appliances which may in turn be the subject of the adaptation process described above.

To the extent that one or more of these appliances may be associated with one or more users, embodiments of the present invention enable recipe sharing among various users as well. For example, a user may share a recipe with a friend and an embodiment of the present invention may adapt the recipe to the friend's appliance. The recipe may itself be tailored to the sharing user's cooking device or it may be appliance neutral, i.e., in a format that is not necessarily adapted to any one cooking device. Again, as any plurality of appliances and associated users may be decomposed into individual pairs of appliances and users or pairs of such pairs, embodiments of the present invention enable recipe sharing among a plurality of users.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved.

Additionally, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

The description and illustration of one or more embodiments provided in this application are not intended to limit or restrict the scope of the present disclosure as claimed in any way. The embodiments, examples, and details provided in this application are considered sufficient to convey possession and enable others to make and use the best mode of the claimed embodiments. The claimed embodiments should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed embodiments.

What is claimed is:

1. A method for adapting recipes to a cooking appliance, the method comprising:

accessing, using a computing device, first electronic data in an electronic data format describing capabilities of a first cooking appliance;

accessing, via a network interface using the computing device, second electronic data in the electronic data format describing capabilities of a second cooking appliance;

comparing the second electronic data with the first electronic data using a schema tree matching algorithm within the electronic data format to determine differences in the capabilities of the first and second cooking appliances;

altering contents of a recipe, designed for the capabilities of the first cooking appliance, using a processor of the computing device, based on the determined differences in the capabilities of the first and second cooking appliances, to adapt the recipe for the second cooking appliance; and converting the adapted recipe into a workflow, provided to a user of the second cooking appliance, to enable performing the adapted recipe on the second cooking appliance.

2. The method of claim 1, wherein accessing the second electronic data describing the capabilities of the second cooking appliance comprises querying an electronic database or the second cooking appliance using the network interface to receive the second electronic data describing the second cooking appliance capabilities.

3. The method of claim 1, wherein adapting the recipe comprises altering at least one of ingredients, ingredient amounts, a cooking temperature, a cooking duration, a recipe format, a cooking operation, and an order of execution, for compatibility with the capabilities of the second cooking appliance.

4. The method of claim 1, further comprising receiving, via the network interface using the computing device, electronic data describing at least one ingredient substitution for the second cooking appliance.

5. The method of claim 1, further comprising converting the recipe into an audio or video communication, and transmitting the audio or video communication to the user of the second cooking appliance.

6. The method of claim 1 further comprising transmitting, via the network interface of the computing device, the adapted recipe to the second cooking appliance.

7. The method of claim 1 wherein the computing device is contained within a cooking appliance.

8. The method of claim 1, wherein comparing the second electronic data with the first electronic data using the schema tree matching algorithm comprises:
building a semantic graph from a data structure of the electronic data format; and
applying the schema tree matching algorithm to the semantic graph.

9. A system for adapting recipes, the system comprising:
a second cooking appliance;
a processor; and
a non-transitory memory storing computer executable instructions that, when executed by the processor, cause the processor to perform a process comprising:
receiving first electronic data in an electronic data format describing capabilities of a first cooking appliance;
receiving second electronic data in the electronic data format describing capabilities of the second cooking appliance;
comparing the first and second electronic data using a schema tree matching algorithm the in electronic data format to determine differences in the capabilities of the first and second cooking appliances;
receiving a recipe designed for the capabilities of the first cooking appliance;
adapting contents of the recipe for the second cooking appliance based on the determined differences in the capabilities of the first and second cooking appliances; and
converting the adapted recipe into a workflow, provided to a user of the second cooking appliance, to enable performing the adapted recipe on the second cooking appliance.

10. The system of claim 9, wherein receiving second electronic data describing the capabilities of the second cooking appliance comprises querying an electronic database or the second cooking appliance to receive electronic data describing the capabilities of the second cooking appliance.

11. The system of claim 9, wherein adapting the recipe comprises altering at least one of ingredients, ingredient quantities, a cooking temperature, a cooking duration, a recipe format, cooking steps, and an order of execution, for compatibility with the capabilities of the second cooking appliance.

12. The system of claim 9, wherein the second electronic data describing capabilities of the second cooking appliance is in schema tree format, and
wherein comparing the firs and second electronic data comprises performing matching algorithms on the schema tree electronic data.

13. The system of claim 9, wherein the processor is contained within the second cooking appliance.

14. The system of claim 9, wherein the processor is contained within the first cooking appliance.

15. The system of claim 9, wherein the process performed by the processor further comprises initially determining whether the recipe can be adapted for use with the second cooking appliance.

16. The system of claim 9, wherein comparing the second electronic data with the first electronic data using the schema tree matching algorithm comprises:
building a semantic graph from a data structure of the electronic data format; and
applying the schema tree matching algorithm to the semantic graph.

17. A system for adapting recipes, the system comprising:
a first cooking appliance;
a processor; and
a non-transitory memory storing computer executable instructions that when executed by the processor, cause the processor to perform a process, comprising:
receiving first electronic data in an electronic data format describing capabilities of the first cooking appliance;
receiving second electronic data in the electronic data format describing capabilities of a second cooking appliance;
comparing the first and second electronic data using a schema tree matching algorithm the electronic data format to determine differences in the capabilities of the first and second cooking appliances and, based on the determined differences, to determine whether a recipe based on the capabilities of the first cooking appliance is adaptable for use with the second cooking appliance;
when it is determined that the recipe is adaptable for use with the second cooking appliance, adapting contents the recipe for the second cooking appliance based on the comparison of the first and second electronic data; and
converting the adapted recipe into a workflow, provided to a user of the second cooking appliance, to enable performing the adapted recipe on the second cooking appliance.

* * * * *